(12) United States Patent
Zerhouni et al.

(10) Patent No.: US 11,769,075 B2
(45) Date of Patent: Sep. 26, 2023

(54) DYNAMIC MACHINE LEARNING ON PREMISE MODEL SELECTION BASED ON ENTITY CLUSTERING AND FEEDBACK

(71) Applicant: Cisco Technology, Inc., San Jose, CA (US)

(72) Inventors: Erwan Barry Tarik Zerhouni, Zürich (CH); Abhishek Kumar, Vancouver (CA); Javier Cruz Mota, Lussy-sur-Morges (CH)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 16/548,710

(22) Filed: Aug. 22, 2019

(65) Prior Publication Data

US 2021/0056463 A1 Feb. 25, 2021

(51) Int. Cl.
*G06N 20/00* (2019.01)
*G06Q 10/067* (2023.01)

(52) U.S. Cl.
CPC .......... *G06N 20/00* (2019.01); *G06Q 10/067* (2013.01)

(58) Field of Classification Search
CPC . G06F 8/60; G06F 8/35; G06F 1/3203; G06F 1/3206; G06N 5/04; G06N 20/00; Y02D 10/00
See application file for complete search history.

(56) References Cited

U.S. PATENT DOCUMENTS

| 10,275,710 | B1 | 4/2019 | Teredesai et al. | |
| 10,545,558 | B1* | 1/2020 | Douglas | G06F 1/325 |
| 2009/0240539 | A1* | 9/2009 | Slawson | G06N 20/00 705/7.29 |
| 2011/0208680 | A1* | 8/2011 | Bovey | G06N 7/01 706/12 |
| 2013/0124885 | A1* | 5/2013 | Davis | G06F 1/325 713/320 |
| 2015/0170053 | A1 | 6/2015 | Miao | |
| 2016/0132787 | A1 | 5/2016 | Drevo et al. | |
| 2017/0017903 | A1* | 1/2017 | Gray | G06T 11/60 |
| 2017/0153906 | A1* | 6/2017 | Bektas | G06F 9/45558 |
| 2017/0185921 | A1 | 6/2017 | Zhang | |
| 2018/0025287 | A1* | 1/2018 | Mathew | G06N 5/04 706/12 |
| 2019/0049981 | A1* | 2/2019 | Fischer | G05D 1/0088 |
| 2019/0332895 | A1* | 10/2019 | Anghel | H04L 43/0876 |
| 2020/0137057 | A1* | 4/2020 | Saha | G06F 11/34 |

FOREIGN PATENT DOCUMENTS

CN 101782976 B 4/2013

* cited by examiner

*Primary Examiner* — Eric J Yoon
(74) *Attorney, Agent, or Firm* — Polsinelli

(57) ABSTRACT

The disclosed technology relates to a process of providing dynamic machine learning on premise model selection. In particular, a set of machine learned models are generated and provided to an on premise computing device. The machine learned models are generated using a cluster of customer data (e.g. telemetric data) stored on a computing network having different ranges of computational complexity. One of the machine learned models from the set of machine learned models will be selected based on the current available computational resources detected at the on premise computing device. Different machine learned models from the set of machine learned models can then be selected based on changes in the available computational resources and/or customer feedback.

12 Claims, 4 Drawing Sheets

DYNAMIC MACHINE LEARNING ON PREMISE MODEL SELECTION BASED ON ENTITY CLUSTERING AND FEEDBACK

TECHNICAL FIELD

The subject matter of this disclosure relates in general to machine learning, and more specifically to dynamic machine learning on premise model selection based on entity clustering and feedback.

BACKGROUND

Machine learning systems perform at their best capabilities when the systems are able to use large amounts of data to train machine learned models—using information that is not only coming from the customer but also from a variety of other sources (e.g. other customers). This allows cloud-based machine learning systems to have an advantage over on premise implementations where an associated computing device would have a more limited data set to work with.

In addition, the computing devices used for the on premise implementations may not always have the computational resources to train machine learned models locally compared to the vast amount of resources that are available with the computing network (e.g., the cloud). Therefore, machine learned models may necessarily be generated and initially trained within the cloud and subsequently provided to the on premise computing device. However, this current solution of training machine learned models for on premise implementations has some issues. First, there is the issue of confidentiality that prevents the use of customer-specific information in the training of the cloud-based machine learned models resulting in machine learned models that are less adapted to the specific on premise computing device. Furthermore, once the machine learned models are provided to the on premise computing device, any further training that needs to be done to the machine learned model (e.g. updates) would need to go through the computing network (e.g., the cloud) again, which requires time and resources from both the cloud and the on premise computing device.

BRIEF DESCRIPTION OF THE FIGURES

In order to describe the manner in which the above-recited and other advantages and features of the disclosure can be obtained, a more particular description of the principles briefly described. Above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

Figure 1:
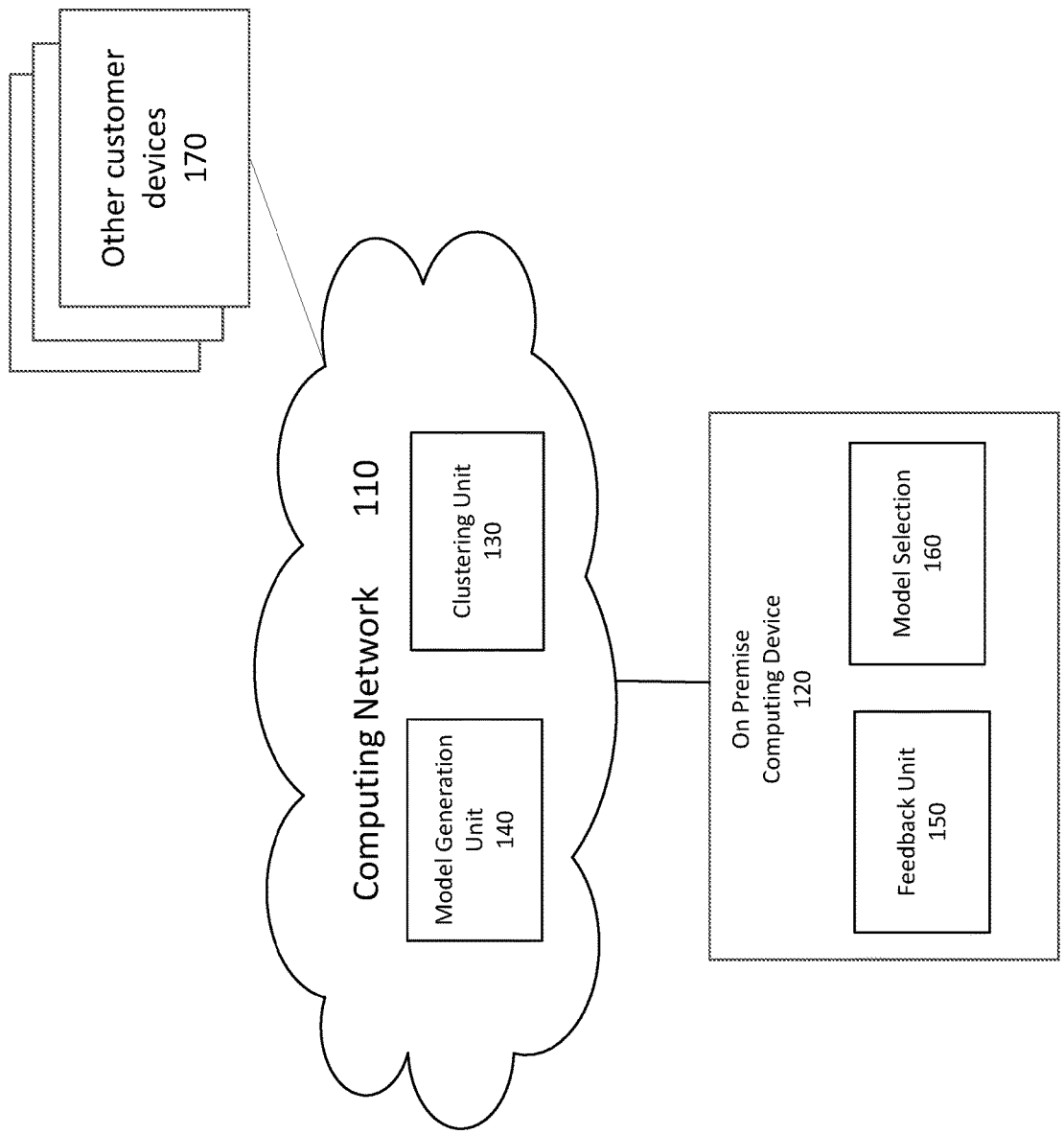
FIG. 1 is a conceptual block diagram illustrating an example network environment in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

Disclosed herein are computer-implemented methods, computer-readable media, and systems for providing machine learned models to an on premise computing device. The machine learned models are generated by first clustering customer data based on similar telemetric parameters whereby the customer data is stored on the computing network (e.g., the cloud). A number of different machine learned models are then generated using the clustered customer data. The machine learned models are then provided to the on premise computing device. The on premise computing device then selects one of the machine learned models from the generated line learned models. In an embodiment, the telemetric parameters correspond to key performance indicators.

In addition, the generating of the different machine learned models can also include generating machine learned models having different levels of computational complexity. Furthermore, the on premise computing device detects current available computational resources at the on premise computing device and selects a machine learned model from all the generated machine learned models having a level of computational complexity that corresponds to the current available computational resources at the on premise computing device.

In another embodiment, changes in the current available computational resources at the on premise computing device can be detected. Based on the detected change in the available computational resources, a different machine learned model can be selected that has a level of computational complexity corresponding to the detected change.

In another embodiment, feedback can be received from the customer at the on premise computing device that then directs the on premise computing device to select a different machine learned model based on the received feedback. In some cases, the feedback corresponds to a performance of the on premise computing device using a currently selected machine learned model.

In another embodiment, customer data can be retrieved from the on premise data. The customer data from the on premise data can be clustered with the customer data stored on the computer network based on similar telemetric parameters. The cluster of the on premise customer data and the customer data stored on the computer network can then be used to generate the plurality of machine learned models that will be provided to the on premise computing device.

EXAMPLE EMBODIMENTS

Additional features and advantages of the disclosure will be set forth in the description which follows, and in part be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present disclosure covers a proposed solution for providing dynamic machine learning on premise model selection. In particular, a variety of different machine learned models are generated within a computing network (e.g., the cloud) using clusters of different telemetric data (e.g. key performance indicators) of different entities (e.g., other customers) that are similar to a computing device located on premise at the customer's location. The generated machine learned models are also generated based c n different ranges of computational complexity. The use of the telemetric data and computational complexity ranges in generating the set of machine learned models provide flexibility at the on premise computing device by allowing the computing device to select which specific machine learned model based on the current state of the on premise computing device and/or feedback from the customer to use rather than requesting new models to be trained from the computing network (e.g., the cloud). The on premise computing device is able to select the appropriate machine learned model from the set of generated machine learned models as the current state of the on premise computing device (e.g., available computation resources) changes and/or additional feedback is received from the customer. Further details regarding the subject technology will be provided below.

FIG. 1 is a conceptual block diagram illustrating an example network environment 100 in accordance with various embodiments of the subject technology. The example network environment 100 includes a computing network (e.g., the cloud) 110. The computing network (e.g., the cloud) 110 is communicatively connected to the on premise computing device 120 located at a customer's location (e.g., place of business). The computing network (e.g., the cloud) 110 is used to collect information from other customer devices 170 in order to generate many different machine learned models that can be provided to the on premise computing device 120.

The computing network (e.g., the cloud) 110 includes a clustering unit 130 that is used to generate the cluster of data that will be the basis for the machine learned models. In an embodiment, the cluster of data corresponds to similar telemetric data (such as key performance indicators) that are shared between the other customer devices 170. Example telemetric data from the other customer devices 170 that are clustered may include (but are not limited to) the following: client count, detected interference, detected power, throughput, number of clients performing onboarding, and average onboarding time although other types of telemetric data can also be used.

By using the cluster of data generated by the clustering unit 130, the model generation unit 140 will generate the set of machine learned models that will be provided to the on premise computing device 120. Each cluster of data will be the basis for a set of different machine learned models.

The machine learned models that are generated by the computing network (e.g., the cloud) 110 and provided to the on premise computing devices 120 are used by the on premise computing devices for a variety of different purposes. For example, the machine learned models can include predictive analytics that can be used by the computing device 120 to predict when potential performance issues (e.g., network congestion) may arise. The on premise computing devices can then utilize the machine learned models to optimize user experiences by 1) addressing the issues when they occur and/or 2) modifying features of the computing device in order to pre-emptively avoid the known issue.

A range of different machine learned models having different levels of computational complexity will also be generated. For example, with reference to the same cluster of data, three different machine learned model may be generated where a first machine learned model may have a low computational complexity, a second machine learned model would have a high computational complexity, and a third machine learned model would have a medium computational complexity. It should be noted that more or less different varieties of machine learned models having different thresholds of computational complexity may be implemented aside from what was described above.

The machine learned models are generated having different levels of computational complexity in order to provide the on premise computing device the flexibility of choosing a machine learned model that is appropriate based on the amount of available computational resources. In an example scenario, an on premise computing device may experience high throughput during typical business working hours (e.g. 8 am-5 pm). Therefore, there may not be much spare computational resources available to utilize machine learned models that require higher computational complexity without interfering with the current operations of the on premise computing device. In contrast, the same on premise computing device may experience low throughput during non-work hours (e.g., 6 pm and later, or weekends) that would allow the same on premise computing device to utilize machine learned models with the high computational complexity. By having different machine learned models be based on different computational complexity, the appropriate machine learned model can be chosen based on the available computational resources at the on premise computing device.

By providing multiple machine learned models that the on premise computing device 120 can choose from, flexibility at the on premise computing device is possible. The on premise computing device is able to select the appropriate machine learned model from the set of different machine learned models to use based on the current state of the on premise computing device, that is specific to the on premise computing device and is done without requiring the interaction of the computing network (e.g., the cloud).

This flexibility provided with the different machine learned model based on the different cluster of data and computational complexity is an improvement over past prior implementations. Specifically, previously a single machine learned model would be provided to on premise computing devices. The single machine learned models lack the flexibility to adapt to the specifics of the on premise computing device and would require that a new machine learned model be provided when the previous machine learned model no longer applied.

Furthermore, because the machine learned models are generated by the computing network (e.g. the cloud) 110 using data from other customers 170, confidentiality and privacy of the on premise computing device 120 can be preserved as no information needs to be shared between the on premise computing device 120 and the computing network (e.g., the cloud) 110 in order for the machine learned models to be generated/trained. Even though no information was shared, the on premise computing device 120 may still be able to identify at least one of the machine learned models from the set of machine learned models that is based on the cluster of data similar to that of the on premise computing device.

In some embodiments, there may be situations where the on premise computing device 120 would be willing to share its data with the computing network (e.g., the cloud) 110. In these scenarios, the cloud 110 may be able to use the on premise computing device data to generate machine learned models. Furthermore, the cloud 110 may also be able to use both the on premise computing device data with data from other customers to generate machine learned models.

After the computing network (e.g., the cloud) 110 generates the set of machine learned models based on the cluster of data and having different ranges of computational complexity, the set of machine learned models is provided to the on premise computational device 120. From there, the on premise computing device 120 will need to choose the appropriate machine learned model from the provided set of machine learned models (via the model selection application 160).

In order to facilitate the choice of the appropriate machine learned model for the on premise computing device, the feedback unit 150 monitors for and retrieves customer feedback about a current performance of the on premise computing device. For example, a first machine learned model ma have already been chosen by default. The customer feedback regarding, for example, performance of the on premise computing device using the chosen machine learned model may be positive or negative. Based on the customer feedback, different machine learned models from the set of machine learned models may be considered and/or chosen.

For example, in one scenario different machine learned models may be considered and chosen from the set of machine learned models as long as the feedback unit 150 is receiving negative customer feedback. Once the feedback unit 150 receives positive customer feedback, this may be indicative that the appropriate machine learned model has been chosen for the on premise computing device 120.

In another embodiment, a ratio of positive and negative feedback can be aggregated for a pre-determined period of time to determine whether a machine learned model is appropriate for the on premise computing device 120. A determination that the appropriate machine learned model is chosen is based on the receipt of positive feedback above a pre-determined threshold (e.g., majority). In contrast, different machine learned models may be chosen if the receipt of negative feedback is above the pre-determined threshold (e.g., majority). Other ways for using customer feedback to determine when to select different machine learned models is also possible.

In addition to using customer feedback via the feedback unit 150, the model selection unit 160 will also detect the current state of the on premise computing device, specifically the available computational resources, to select an appropriate machine learned model. Depending on what processes are currently being run on the on premise computing device, different machine learned models may be chosen according to the available computing resources that can be assigned. For example, each machine learned model may be associated with a pre-determined threshold amount of computational resources that would be needed in order to properly utilize the associated machine learned model. In addition, the on premise computing device may also include an indication of what amount of computational resources are available that can be devoted for use with different machine learned models without affecting the existing processes currently being run on the on premise computing device.

Figure 2:
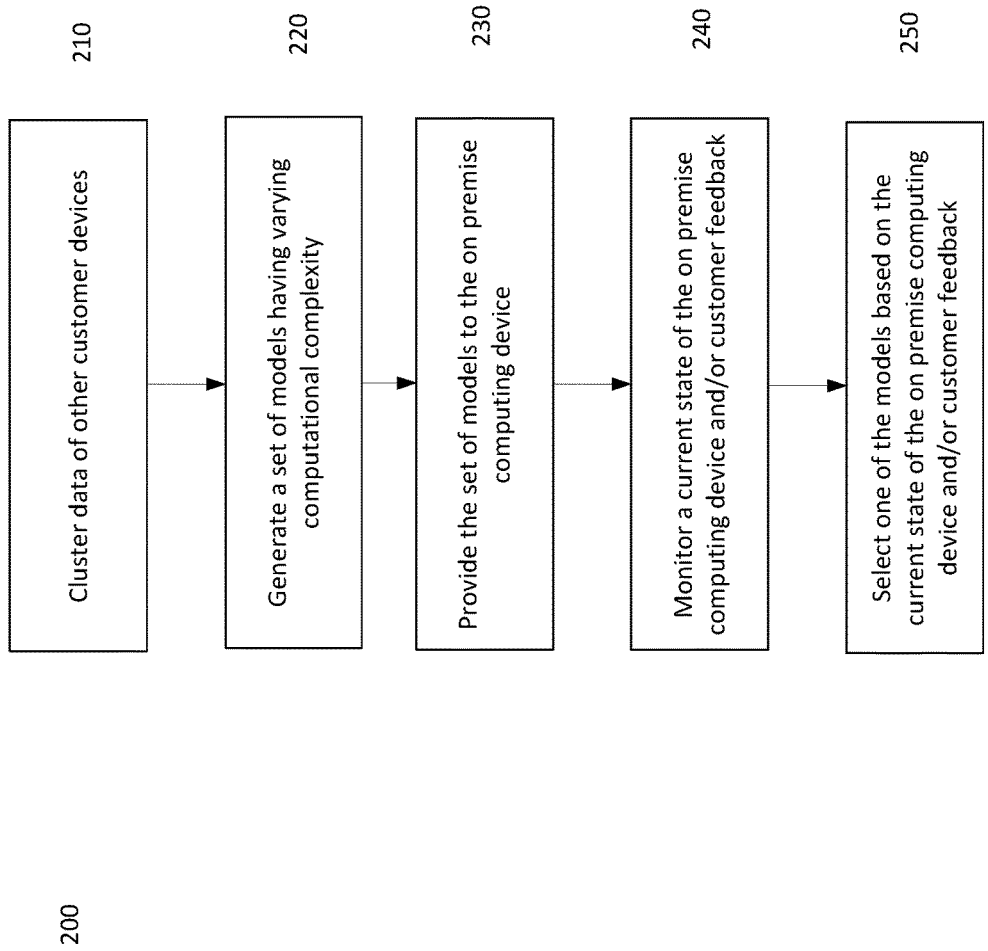
FIG. 2 shows an example method in accordance with various embodiments of the subject technology.

FIG. 2 shows an example method 200 accordance with various embodiments of the subject technology. The method 200 describes how a set of machine learned models can be generated for an on premise computing device and how the computing device is then able to select from the set of machine learned models to use based on, for example, a current state of the on premise computing device and/or feedback from the customer.

In step 210, data of other customer devices are clustered in the computing network (e.g., the cloud). This allows confidentiality and security to be maintained at the on premise computing device as no information will be provided to the computing network. The data (e.g., telemetric data) being clustered into groups share similarity and will be used as a basis in generating the different machine learned models that will be provided to the on premise computing device. The data that will be clustered, via step 210, include telemetric data (e.g., key performance indicators) used to characterize performance of each of the other customer computing devices. Example telemetric data include client count, detected interference, detected power, throughput, number of clients performing onboarding, and average onboarding time. It should be noted that other types of telemetric data can also be used.

In step 220, a set of machine learned models are generated based on the clustered data. For example, multiple different machine learned models may be created based on the use of throughputs the underlying data. When the set of machine learned models is provided to the on premise computing device, it is not known which of the machine learned models is most similar to the on premise computing device. By providing different machine learned models based on throughput, the on premise computing device is able to select the most appropriate machine learned model.

In addition, the set of models being generated using the clustered data will also include variations of the machine learned models that take into account varying computational complexity. For example, multiple models using the same throughput clustered data can be generated take into account an amount of computational resources needed to use the machine learned model. Since it is unknown what computational resources may be available at the on premise computing device, and the availability of such resources can change over time at the on premise computing device, the variety of different machine learned models having different computational complexity provides the on premise computing device the ability to choose the model that corresponds to the available computational resources.

The creation of the different machine learned models using the clustered data and the different computational complexity provides the on premise computing device a lot of variety in being able to choose the appropriate machine learned model. Rather than requesting a new or updated machine learned model from the computing network (e.g., the cloud) each time a current machine learned model being used becomes outdated, the computing device is instead able to provide the on premise computing device with the set of machine learned models (in step 230). The on premise computing device is then able to go through the set of machine learned models and choose the appropriate machine learned model without needing to again communicate with the computing network (e.g., the cloud).

The choice of which machine learned model to choose will be based on, for example, detecting a current state of the on premise computing device (e.g., available resources) in step 240. Different models having different computational complexity can be chosen based on the available computational resources at the on premise computing device. As the availability of resources change over time, different machine learned models can also be chosen.

Furthermore, in step 240, customer feedback can be received that provides an indication (e.g., negative or positive) whether a different machine learned model should be chosen. For example, a customer's user experience may make note that the current performance of the on premise computing device is not satisfactory. This may be then used as an indication that a different machine learned model should be chosen. By using both the detected current state of the on premise computing device and/or customer feedback, an appropriate model is chosen in step 250.

Figure 3:
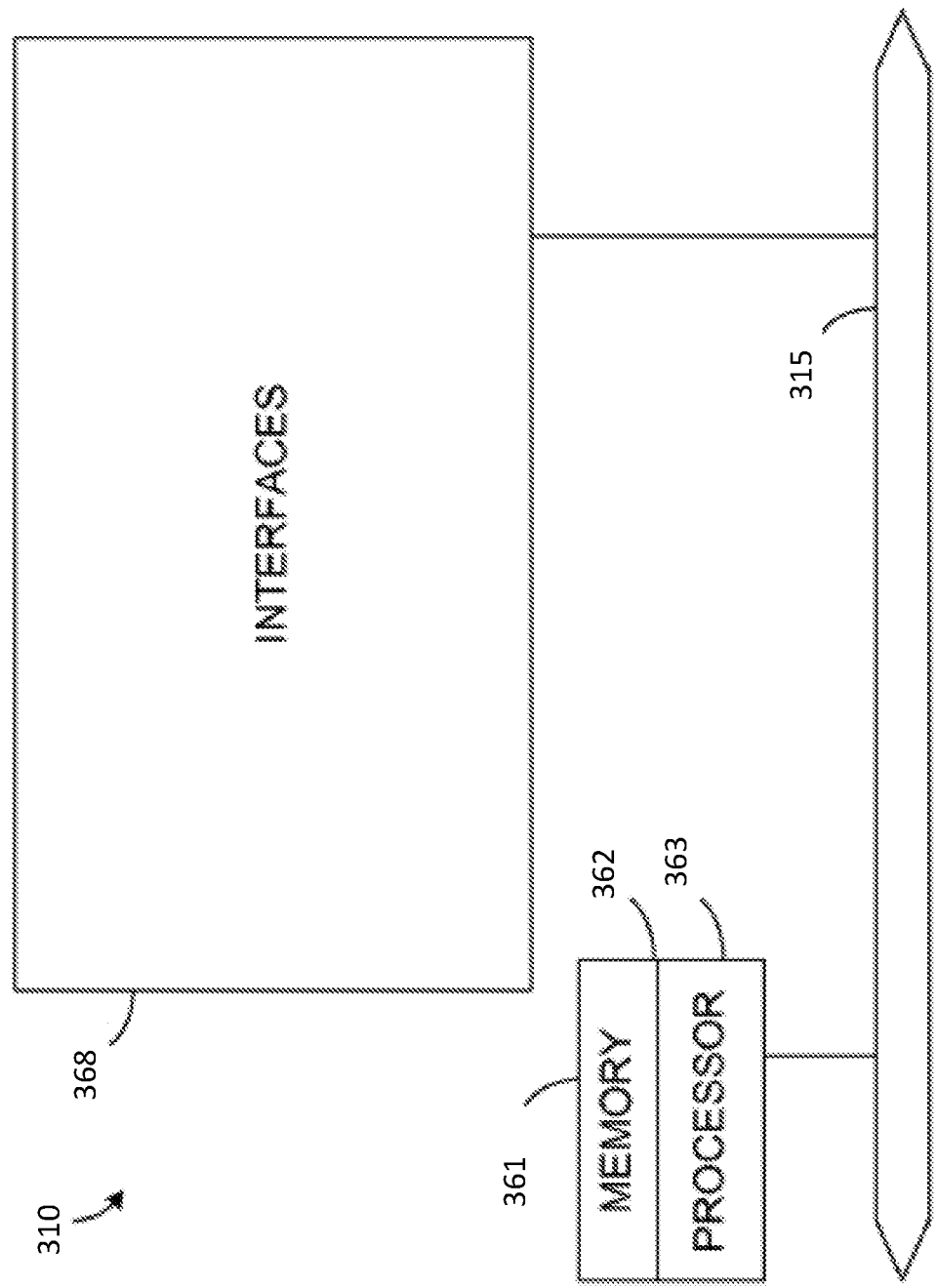
FIG. 3 illustrates an exemplary network device in accordance with various embodiments of the subject technology.

FIG. 3 illustrates an exemplary network device 310 in accordance with various embodiments of the subject technology. Network device 310 includes a master central processing unit (CPU) 362, interfaces 368, and a bus 315 (e.g., a PCI bus). When acting under the control of appropriate software or firmware, the CPU 662 is responsible for performing the steps illustrated in FIG. 2. The CPU 362 preferably accomplishes all these functions under the control of software including an operating system and any appropriate applications software. CPU 362 may include one or more processors 363 such as a processor from the Motorola family of microprocessors or the MIPS family of microprocessors. In an alternative embodiment, processor 363 is specially designed hardware for controlling the operations of the network device 310. In a specific embodiment, a memory 661 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the network device 310. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interface's may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 3 is one specific network device of the present embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 4:
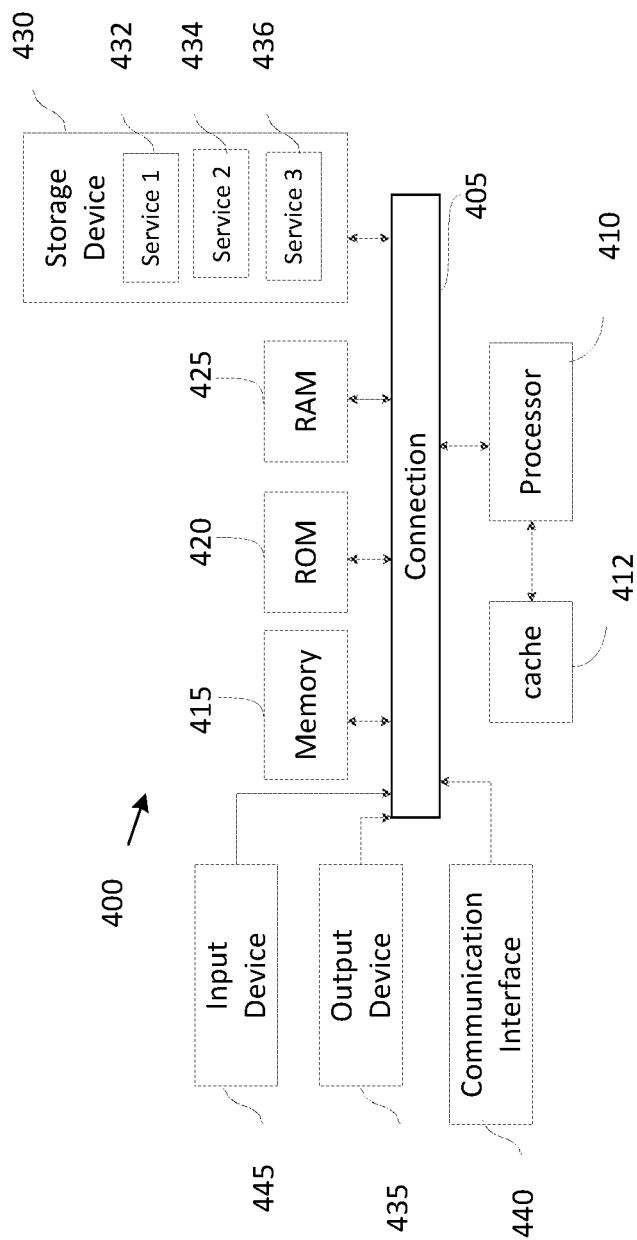
FIG. 4 shows an example computing system in accordance with various embodiments of the subject technology.

FIG. 4 shows an example computing system 400 in accordance with various embodiments of the subject technology. The example computing device can correspond to the computing devices associated with the customer's on premise computing illustrated in FIG. 1. Furthermore, the example computing device may also make up any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware firmware arrangements as the are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMS), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium connection with the necessary hardware components, such as processor 410, connection 405, output device 435, etc., to carry out the function.

For clarity of explanation, in some instances the present technology may be presented as including individual functional blocks including functional blocks comprising devices, device components steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops smart phones, small form factor personal computers personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based an particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather the described features and steps are disclosed as examples of components of systems and methods within the scope of the appended claims.

The invention claimed is:

1. A method for providing machine learned models to an on premise computing device, the method comprising:
   clustering other customer data including similar telemetric parameters, wherein the customer data is stored on a computing network, the similar telemetric parameters including client count, detected interference, detected power, throughput, number of clients performing onboarding, and average onboarding time;
   generating, based on the clustered other customer data, at least first and second machine learned models, the first machine learned model requiring a predefined minimum of a first amount of computational resources needed to execute the first machine learned model, the second machine learned model requiring a predefined minimum second amount of computational resources needed to execute the second machine learned model, the first amount being greater than the second amount; and
   providing the first and second machine learned models to an on premise computing device, wherein the on premise computing device:
      selects the first machine learned model in response to at least the available computational resources of the on premise computing device being greater than the first amount of computational resources;
      receives negative feedback, from a customer, wherein the feedback states the customer's current user experience of the on premise device with the first machine learned model is unsatisfactory; and
      selects the second machine learned model in response to at least the received negative feedback and the available computational resources of the on premise computing device being greater than the second amount of computational resources.

2. The method of claim 1, wherein the similar telemetric parameters comprise key performance indicators.

3. The method of claim 1, further comprising:
   retrieving customer data from the on premise computing device;
   clustering the customer data with the other customer data based on similar telemetric parameters; and
   generating the first and second machine learned models using the cluster of customer data and the other customer data.

4. The method of claim 1, wherein the first and second amounts of computational resources correspond to amounts of throughput experienced by the on premise computing device over a period of time.

5. A non-transitory computer-readable medium comprising instructions for providing machine learned models to an on premise computing device, the instructions, when executed by a computing system, cause the computing system to perform operations comprising:
clustering other customer data including similar telemetric parameters, wherein the customer data is stored on a computing network, the similar telemetric parameters including client count, detected interference, detected power, throughput, number of clients performing onboarding, and average onboarding time;
generate, based on the clustered other customer data, at least first and second machine learned models, the first machine learned model requiring a predefined minimum of a first amount of computational resources needed to execute the first machine learned model, the second machine learned model requiring a predefined minimum of a second amount of computational resources needed to execute the second machine learned model, the first amount being greater than the second amount; and
provide the first and second machine learned models to an on premise computing device, wherein the on premise computing device:
selects the first machine learned model in response to at least the available computational resources of the on premise computing device being greater than the first amount of computational resources;
receives negative feedback, from a customer, wherein the feedback states the customer's current user experience of the on premise device with the first machine learned model is unsatisfactory; and
selects the second machine learned model in response to at least the received negative feedback and the available computational resources of the on premise computing device being greater than the second amount of computational resources.

6. The non-transitory computer-readable medium of claim 5, wherein the similar telemetric parameters comprise key performance indicators.

7. The non-transitory computer-readable medium of claim 5, wherein further instructions in the non-transitory computer readable medium, when executed by the computing system, cause the computing system to:
retrieve customer data from the on premise computing device;
cluster the customer data with the other customer data based on similar telemetric parameters; and
generate the first and second machine learned models using the cluster of customer data and the other customer data.

8. The non-transitory computer-readable medium of claim 5, wherein the first and second amounts of computational resources correspond to amounts of throughput experienced by the on premise computing device over a period of time.

9. A system for providing machine learned models to an on premise computing device, the system comprising:
a processor; and
a non-transitory computer-readable medium storing instructions that, when executed by the system, cause the system to:
cluster other customer data including similar telemetric parameters, wherein the customer data is stored on a computing network, the similar telemetric parameters including client count, detected interference, detected power, throughput, number of clients performing onboarding, and average onboarding time;
generate, based on the clustered other customer data, at least first and second machine learned models for the cluster of the other customer data, the first machine learned model requiring a predefined minimum of a first amount of computational resources needed to execute the first machine learned model, the second machine learned model requiring a predefined minimum of a second amount of computational resources needed to execute the second machine learned model, the first amount being greater than the second amount; and
provide the first and second machine learned models to an on premise computing device, wherein the on premise computing device:
selects the first machine learned model in response to at least the available computational resources of the on premise computing device being greater than the first amount of computational resources;
receives negative feedback, from a customer, wherein the feedback states the customer's current user experience of the on premise device with the first machine learned model is unsatisfactory; and
selects the second machine learned model in response to at least the received negative feedback and the available computational resources of the on premise computing device being greater than the second amount of computational resources.

10. The system of claim 9, wherein the similar telemetric parameters comprise key performance indicators.

11. The system of claim 9, wherein further instructions in the non-transitory computer-readable medium, when executed by the system, cause the system to:
retrieve customer data from the on premise computing device;
cluster the customer data with the other customer data based on similar telemetric parameters; and
generate the first and second machine learned models using the cluster of customer data and the other customer data.

12. The system of claim 9, wherein the first and second amounts of computational resources correspond to amounts of throughput experienced by the on premise computing device over a period of time.

* * * * *